(12) United States Patent
Miyata et al.

(10) Patent No.: US 7,387,584 B2
(45) Date of Patent: Jun. 17, 2008

(54) DRIVE BELT PULLEY AND BELT DRIVE SYSTEM

(75) Inventors: Hirofumi Miyata, Hyogo (JP); Shinichiro Nishikawa, Hyogo (JP); Masashi Yoshimura, Hyogo (JP)

(73) Assignee: Bando Chemical Industries, Ltd., Hyogo (JP)

( * ) Notice: Subject to any disclaimer, the term of this patent is extended or adjusted under 35 U.S.C. 154(b) by 662 days.

(21) Appl. No.: 10/944,709

(22) Filed: Sep. 21, 2004

(65) Prior Publication Data

US 2005/0070387 A1 Mar. 31, 2005

(30) Foreign Application Priority Data

Sep. 26, 2003 (JP) ............................. 2003-335716
Mar. 4, 2004 (JP) ............................. 2004-060354

(51) Int. Cl.
*F16H 55/32* (2006.01)
*F16H 7/20* (2006.01)
*F16D 3/14* (2006.01)

(52) U.S. Cl. .................... 474/197; 474/94; 474/199; 474/902

(58) Field of Classification Search .................. 474/79, 474/101, 109, 110, 135–138, 94, 171, 189, 474/199, 902; 464/67.1, 74, 83; 74/411, 74/570.1, 574.4
See application file for complete search history.

(56) References Cited

U.S. PATENT DOCUMENTS 306,267 A * 10/1884 La. Turno .................. 464/67.1
1,733,378 A * 10/1929 Kutter ........................ 74/570.1
2,262,325 A * 11/1941 Kendall ........................ 474/94

(Continued)

FOREIGN PATENT DOCUMENTS

JP 51-010462 0/1976

(Continued)

OTHER PUBLICATIONS

Specification and Drawings for U.S. Appl. No. 10/875,296 filed Jun. 25, 2004.

(Continued)

*Primary Examiner*—Marcus Charles
(74) *Attorney, Agent, or Firm*—Studebaker & Brackett PC; Donald R. Studebaker

(57) ABSTRACT

A hollow cylindrical pulley body 5 is carried rotatably by a hollow cylindrical shaft member 11. A support rod 8 is inserted in the shaft member 11, and the shaft member 11 is elastically supported to the support rod 8 through an elastic body 10. The elastic body 10 is provided within a quarter of the periphery of the support rod 8 that is located, when viewed along the axis of the shaft member 11, forward of the line of action of a radial shaft load on the shaft member 11 with respect to the direction of rotation of the pulley body 5. With this configuration, when the drive belt 3 deviates to one side, the pulley body 5 is immediately angularly moved so that it is inclined with a level difference with respect to the direction of the radial shaft load and is positioned obliquely relative to the drive belt 3. In this manner, a force of compensating for the deviation of the drive belt 3 is produced to avoid its wobbling.

7 Claims, 13 Drawing Sheets

U.S. PATENT DOCUMENTS

| | | | | |
|---|---|---|---|---|
| 3,216,267 | A * | 11/1965 | Dolza | 474/94 |
| 3,524,359 | A * | 8/1970 | Buchwald | 474/94 |
| 4,355,990 | A * | 10/1982 | Duncan, Jr. | 474/94 |
| 4,486,183 | A * | 12/1984 | Posiviata et al. | 474/94 |
| 5,441,458 | A * | 8/1995 | Rogus | 474/197 |
| 5,803,235 | A * | 9/1998 | McGinnis et al. | 474/902 |
| 6,074,301 | A | 6/2000 | Okada et al. | |
| 6,161,512 | A * | 12/2000 | Beels Van Heemstede | 474/94 |
| 6,200,221 | B1 | 3/2001 | Maejima et al. | |
| 6,336,883 | B1 | 1/2002 | Beve et al. | |

FOREIGN PATENT DOCUMENTS

| | | |
|---|---|---|
| JP | 46-12579 | 4/1971 |
| JP | 56-088013 | 7/1981 |
| JP | 59-45351 | 3/1984 |
| JP | 59040060 A * | 3/1984 |
| JP | 62067357 A * | 3/1987 |
| JP | 63-006520 | 2/1988 |
| JP | 63254266 A * | 10/1988 |
| JP | 03149440 * | 6/1991 |
| JP | 05149375 A * | 6/1993 |
| JP | 03-073544 | 7/1993 |
| JP | 06-307521 A | 11/1994 |
| JP | 2003-214509 | 7/2003 |

OTHER PUBLICATIONS

European Search Report Appl. No. EP 04 02 2537 dated Nov. 17, 2004.

Notice of Reasons of Rejection, JP 2004-060354, Sep. 12, 2006.

* cited by examiner

DRIVE BELT PULLEY AND BELT DRIVE SYSTEM

CROSS-REFERENCES TO RELATED APPLICATIONS

This application claims priority under 35 USC 119 to Japanese Patent Applications No. 2003-335716 filed on Sep. 26, 2003 and No. 2004-60354 filed on Mar. 4, 2004, the entire disclosure of each of which, including specification, drawings and claims, is incorporated herein by reference in its entirety.

BACKGROUND OF THE INVENTION (a) Field of the Invention

This invention relates to drive belt pulleys and belt drive systems.

(b) Description of the Related Art

In drive systems using a flat belt, the flat belt when running often causes wobbling and sidetracking towards one side of the pulley. This is because a flat belt is susceptible, as compared with the other kinds of drive belts, to position changes of drive system components, such as deviation of a pulley shaft from its normal position, deflection thereof due to change in radial load thereon, and pulley wobbling. If such a belt wobbling or sidetracking occurs, then the flat belt may come into contact with a flange of the flat pulley, resulting in a fuzzed flat belt side face or a frayed cord.

A known approach to this problem is to crown the outer periphery of a flat pulley (i.e., to form it into a convex surface). There is also a proposed technique to form the crown at the outer periphery of a pulley into the shape of a sphere around the rotation center of the pulley (see, for example, Japanese Unexamined Utility-Model Publication No. 59-45351). This proposed technique is intended, when a tension difference arises between the right and left portions of the flat belt to cause an inclination of the pulley shaft and its attendant deviation of the flat belt to one side of the pulley, to take the advantage of rotation moment acting on the pulley by tension of the flat belt to eliminate the inclination (angular deviation) of the pulley shaft and the deviation of the flat belt.

There is also known a flat pulley the outer periphery of which has a multiplicity of grooves formed at regular intervals along its circumference (see, for example, Japanese Unexamined Patent Publication No. 6-307521). Each groove extends to form a V-shape symmetrically from the middle of the pulley width toward both sides. These grooves create between the flat belt and the pulley a frictional force which allows the flat belt to approach the middle of the pulley width, thereby preventing wobbling and sidetracking of the belt.

There is still also known a technique to place guide rollers to both sides of a flat belt and thereby limit the running position of the flat belt (see, for example, Japanese Examined Utility-Model Publication No. 63-6520).

The first-mentioned approach of crowning the pulley groove surface, however, has the following problem. When the curvature of the crown is set at a small value taking count of running stability of the flat belt (prevention of wobbling and sidetracking), stress is focused on the middle of the belt width. This prevents effective utilization of the entire belt width for power transmission and leads to early cord fatigue and degraded power transmission performance.

The above-mentioned technique of forming the pulley crown into a sphere around the rotation center of the pulley, even if it enhances the effect of preventing sidetracking of a drive belt, still has the above problem that stress is focused on the middle of the belt width by the pulley crown.

The above-described grooving of the flat pulley surface raises the production cost of the flat pulley. In addition, it is difficult to certainly prevent wobbling and sidetracking of the flat belt simply by the grooving.

When the approach is employed of limiting the running position of the flat belt by placing guide rollers or the like to both sides thereof, both sides of the flat belt always contact such a limiting member. As a result, the belt side face is likely to fuzz and the cord is likely to fray. This creates the need for applying to the flat belt a special process for preventing such adverse effects, which is a disadvantage to reduction of production cost of the flat belt.

For the above-described reasons, the fact is that though flat belt drive systems have lower loss due to belt flexing and very higher power transmission efficiency as compared with systems using other types of belts, such as V-belts, they are not exploited enough.

SUMMARY OF THE INVENTION

With the foregoing in mind, the present invention aims at enabling reliable prevention of wobbling and sidetracking of flat belts or other drive belts and in turn at effective utilization of belt drive systems for various kinds of industrial machines and other equipment.

To achieve the above aim, the present invention prevents sidetracking and wobbling of a drive belt by changing the attitude of a pulley appropriately using the phenomenon that the center of radial load on a pulley shaft changes by tension of the drive belt when the drive belt deviates to one side of the pulley.

More specifically, a drive belt pulley according to a first aspect of the present invention comprises:

a hollow cylindrical pulley body around which a drive belt is to be wrapped;

a hollow cylindrical shaft member that rotatably carries the pulley body;

a support rod that is inserted in the shaft member and has a smaller diameter than the hole of the shaft member; and an elastic body that elastically supports the shaft member, together with the pulley body, to the periphery of the support rod, wherein the elastic body is provided to constrain the shaft member to the support rod with a higher degree within a quarter (within the angular range from 0° to 90°) of the periphery of the support rod that is located, when viewed along the axis of the shaft member, forward of the line of action of a radial shaft load on the shaft member with respect to the direction of rotation of the pulley body than within the rest of the periphery of the support rod.

According to this drive belt pulley, when the running drive belt deviates to one side of the pulley body, the component of the radial shaft load on the one side of the pulley body accordingly becomes larger than that on the other side. Owing to the deviated radial shaft load, the shaft member and the pulley body angularly move in a manner that their one sides move toward the direction of the radial shaft load relative to their other sides and concurrently move forward in the travel direction of the drive belt relative to their other sides with the portion of the shaft member constrained to the support rod with a high degree acting as a fulcrum.

To be specific, since the side of the pulley body toward which the drive belt has deviated moves toward the direction of a radial shaft load on the shaft member, the pulley body is inclined so that when its working surface height is viewed with respect to the direction of the radial shaft load, the side thereof toward which the drive belt has deviated is lower and the opposite side is higher. In other words, the outer periphery of the pulley body is inclined like the case where it is crowned. The drive belt thus receives a return force opposite to the direction of its deviation.

Furthermore, since the side of the pulley body toward which the drive belt has deviated moves forward in the direction of belt travel, the pulley body assumes an oblique position that the side thereof toward which the drive belt has deviated is located forward in the direction of belt travel relative to the other side. When the pulley rotates in this oblique position, a force in the direction to compensate for the deviation is applied from the pulley body to the drive belt.

As a result, the drive belt runs at a position where equilibrium is established between the return force due to the angular movement of the pulley body as described above and a deviation force acting on the drive belt according to the characteristics of the belt drive system. Even if the drive belt largely deviates to one side, it is immediately returned to the position where equilibrium is established between the return force and the deviation force.

Furthermore, since the pulley body and the shaft member are elastically supported to the support rod, vibration of the running drive belt is absorbed by the elasticity of the elastic body and noise during angular movement of the pulley body relative to the support rod is reduced.

When the elastic body is provided only within the particular quarter of the support rod periphery, the whole elastic body acts to constrain the shaft member with a higher degree than within the rest of the support rod periphery. The present invention, however, is not limited to such a configuration, but includes a configuration in which a plurality of elastic bodies are arranged at circumferentially spaced positions on the support rod periphery and a configuration in which a single elastic body is provided over the entire circumference of the support rod periphery. These configurations are applicable so long as the elastic body or the portion of the single elastic body located within the particular quarter of the rod support periphery has a highest elastic coefficient to have a highest degree of constraint of the shaft member.

The elastic body may be made of rubber or formed of a metal spring. When a rubber elastic body is employed as the elastic body, highly- and weakly-constrained portions of the shaft member can be formed by locally changing the ratio of mixing of short fibers into rubber. A cavity may be provided inside of the elastic body.

The elastic body may be provided internally with a gas cell filled with compressed gas of a predetermined pressure (a fifth aspect of the invention). With this configuration, the elastic body can change its elastic modulus (elastic coefficient) according to the pressure in the gas cell. Therefore, the degree of angular movement of the pulley body and the shaft member relative to the support rod can be controlled by controlling the gas pressure. The proper equilibrium can be thereby established between the deviation force acting on the drive belt as described above and the return force.

Alternatively, the elastic body may be provided internally with a plurality of liquid cells each filed with damping liquid and one or more orifice paths connecting at least two of the liquid cells (a sixth aspect of the invention). With this configuration, when the pulley body and the shaft member have angularly deviated from their normal position with respect to the support rod because of vibration of the running drive belt, the elastic body deforms so that the damping liquid flows through the orifice path or paths from one liquid cell to another. This flow resistance also provides vibration attenuation capability. In addition, if the length and sectional area of the orifice path is set suitably, the capability of attenuating vibrations over a specific frequency range can be improved. Furthermore, if magnetic fluid or magnetorheological fluid is used as the damping liquid in the liquid cell, the flow resistance can be changed by applying a magnetic force to the damping liquid, which makes it possible to variably control the vibration attenuation capability.

The elastic body may be provided only approximately in the middle of the width of the pulley body or may be provided over the entire width thereof. Even for an elastic body over the entire width of the pulley body, when the drive belt deviates to one side of the pulley body, a radial shaft load acts with a higher degree on the side of the pulley body toward which the drive belt has deviated than on the opposite side thereof, so that the pulley body angularly moves to assume an oblique position to the drive belt.

Preferably, the elastic body is made of rubber and placed on the periphery of the support rod to the side of the pulley body around which the drive belt is wrapped (a second aspect of the invention).

With this configuration, the radial shaft load acts mainly as a compressive load on the rubber elastic body, which is advantageous in ensuring the durability of the rubber elastic body. Furthermore, since portions of the shaft member other than that thereof corresponding the quarter provided with the rubber elastic body are not constrained to the support rod, the pulley body can easily be moved angularly by the radial shaft load, which is advantageous in preventing wobbling and sidetracking of the drive belt.

A drive belt pulley according to a third aspect of the present invention comprises:

a hollow cylindrical pulley body around which a drive belt is to be wrapped;

a hollow cylindrical shaft member that rotatably carries the pulley body;

a support rod that is inserted in the shaft member and has a smaller diameter than the hole of the shaft member; and an elastic body that elastically supports the shaft member, together with the pulley body, to the periphery of the support rod, wherein the elastic body is provided so that when the drive belt deviates to one side of the pulley body, a radial shaft load on the shaft member causes the pulley body to produce an angular movement in which the one side of the pulley body moves in the direction of the radial shaft load relative to the other side of the pulley body.

According to this drive belt pulley, when the drive belt deviates to one side of the pulley body, the pulley body is inclined so that when its working surface height is viewed with respect to the direction of the radial shaft load, the side thereof toward which the drive belt has deviated is lower and the opposite side is higher. The drive belt thus receives a return force opposite to the direction of its deviation, thereby preventing wobbling and sidetracking of the drive belt.

A drive belt pulley according to a fourth aspect of the present invention comprises:

a hollow cylindrical pulley body around which a drive belt is to be wrapped;

a hollow cylindrical shaft member that rotatably carries the pulley body;

a support rod that is inserted in the shaft member and has a smaller diameter than the hole of the shaft member; and an elastic body that elastically supports the shaft member, together with the pulley body, to the periphery of the support rod, wherein the elastic body is placed at a single location on the periphery of the support rod and approximately in the middle of the width of the pulley body.

According to this drive belt pulley, when it is used by placing the elastic body within a quarter of the periphery of the support rod that is located forward of the line of action of a radial shaft load on the shaft member with respect to the direction of rotation of the pulley body, sidetracking and wobbling of the drive belt can be prevented as in the first aspect of the invention.

On the other hand, in another state of use of the drive belt pulley in which the elastic body is positioned on the line of action of the radial shaft load, when the drive belt deviates to one side, the pulley body can be angularly moved to an inclined position that the side thereof toward which the drive belt has deviated moves toward the direction of the radial shaft load relative to the other side thereof. Therefore, as in the third aspect of the invention, sidetracking and wobbling of the drive belt can be prevented.

Furthermore, the elastic body is placed on a portion of the periphery of the support rod located approximately in the middle of the width of the pulley body and the shaft member is not constrained at both sides of that portion to the support rod. Therefore, when the drive belt deviates to one side, the pulley body can easily angularly move with the elastic body as a fulcrum, which is advantageous in preventing sidetracking and wobbling of the drive belt.

A belt drive system according to a seventh aspect of the present invention is a system in which the drive belt pulley as described above is pushed against a drive belt to apply tension to the drive belt.

This belt drive system can prevent wobbling and sidetracking of the drive belt while applying a stable tension to the drive belt, which is advantageous in bringing out a full power transmission performance of the drive belt.

Drive belts of the present invention include all types of belts such as flat belts and synchronous belts (timing belts). For flat belts, either of their inner face (working face) and outer face (back face) may be contacted with a pulley body. For synchronous belts, their outer face (back face) is preferably contacted with a pulley body.

As described above, in the first aspect of the invention, a hollow cylindrical pulley body is rotatably carried on a hollow cylindrical shaft member, a support rod is inserted in the shaft member, and the shaft member is elastically supported, together with the pulley body, through an elastic body to the periphery of the support rod. When the drive belt deviates to one side on the pulley body, the pulley body is inclined with a level difference with respect to the direction of the radial shaft load and is positioned obliquely relative to the drive belt. Therefore, the drive belt pulley can immediately and certainly eliminate sidetracking and wobbling of the drive belt with a simple structure.

This allows a flat pulley to have a gentle crown and enables even the use of a flat pulley with no crown. In other words, the designing of a pulley can be facilitated. At the same time, the tension distribution of a cord of a drive belt can be uniformed and stabilized, which is advantageous in improvement in durability and power transmission performance of the drive belt.

In the second aspect of the invention, the elastic body is made of rubber, and placed on a quarter of the periphery of the support rod that is located to the side of the pulley body around which the drive belt is wrapped and forward of the line of action of a radial shaft load on the shaft member with respect to the direction of rotation of the pulley body. This is advantageous in ensuring the durability of the rubber elastic body. In addition, the pulley body can easily be moved angularly by the radial shaft load, which is advantageous in preventing wobbling and sidetracking of the drive belt.

In the third aspect of the invention, a hollow cylindrical pulley body is rotatably carried on a hollow cylindrical shaft member, a support rod is inserted in the shaft member, and the shaft member is elastically supported, together with the pulley body, through an elastic body to the periphery of the support rod. When the drive belt deviates to one side on the pulley body, the pulley body is inclined with respect to the direction of the radial shaft load. Therefore, the drive belt pulley can immediately and certainly eliminate sidetracking and wobbling of the drive belt with a simple structure.

In the fourth aspect of the invention, a hollow cylindrical pulley body is rotatably carried on a hollow cylindrical shaft member, a support rod is inserted in the shaft member, the shaft member is elastically supported, together with the pulley body, through an elastic body to the periphery of the support rod, and the elastic body is placed at a single location on the periphery of the support rod and approximately in the middle of the width of the pulley body. Therefore, when the elastic body is positioned within the above-described quarter of the periphery of the support rod or on the line of action of the radial shaft load, the drive belt pulley can immediately and certainly eliminate sidetracking and wobbling of the drive belt with a simple structure.

In the fifth aspect of the invention, since the elastic body is provided internally with a gas cell, the elastic modulus of the elastic body can be changed by controlling the pressure in the gas cell, whereby the degree of angular movement of the pulley body and the shaft member can be controlled. The proper equilibrium can be thereby established between the deviation force acting on the drive belt and the return force.

In the sixth aspect of the invention, since the elastic body is provided internally with a plurality of liquid cells and one or more orifice paths, this improves the capability of attenuating vibration of the running drive belt. Furthermore, if magnetic fluid or the like is used as the damping liquid in the liquid cell, the vibration attenuation capability can be variably controlled.

The belt drive system according to the seventh aspect of the invention is a system in which the drive belt pulley as described above is pushed against a drive belt to apply tension to the drive belt. Therefore, this belt drive system can prevent wobbling and sidetracking of the drive belt while applying a stable tension to the drive belt, which is advantageous in bringing out a full power transmission performance of the drive belt.

DESCRIPTION OF THE PREFERRED EMBODIMENTS

Hereinafter, embodiments of the present invention will be described in detail with reference to the drawings.

Figure 1:
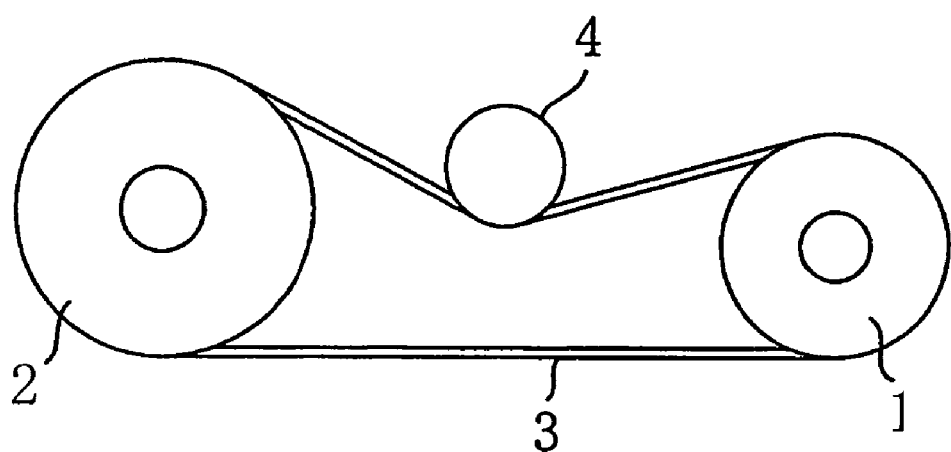
FIG. 1 is a side view of a belt drive system according to the present invention.

In a belt drive system of a first embodiment of the invention shown in FIG. 1, reference numeral 1 denotes a drive pulley (flat pulley), and reference numeral 2 denotes a driven pulley (flat pulley). A drive belt (flat belt) 3 is wrapped around both the pulleys 1 and 2. A drive belt pulley 4 is pushed against the back face of the drive belt 3 in order to apply tension to the drive belt 3.

Figure 2:
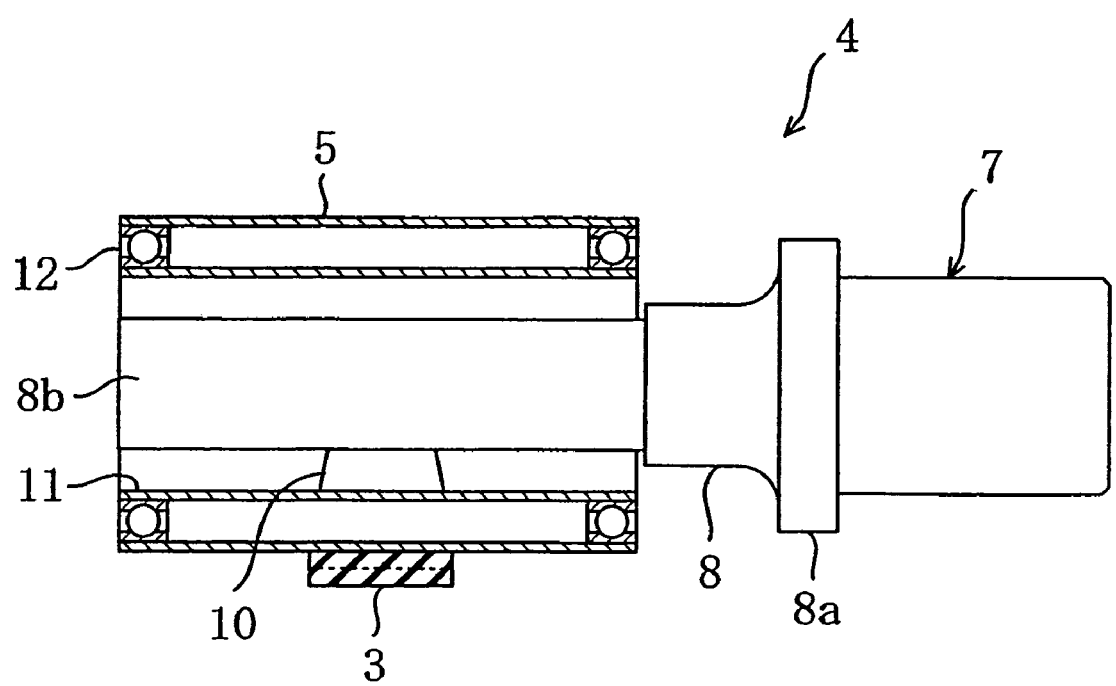
FIG. 2 is a partly sectional side view showing a drive belt pulley according to a first embodiment of the present invention.

As shown in FIG. 2, the pulley 4 has a hollow cylindrical pulley body 5 around which the drive belt 3 is to be wrapped, a hollow cylindrical shaft member 11 that rotatably carries the pulley body 5 via bearings 12, and a support member 7 that supports the shaft member 11. The support member 7 is provided with a support rod 8 and a rubber elastic body 10.

The support rod 8 consists of an attachment part 8a and a supporting part 8b continued from one end of the attachment part 8a. The attachment part 8a is attached to a support, such as a housing, in which the belt drive system is disposed. The supporting part 8b is inserted into the hole of the hollow cylindrical shaft member 11. The supporting part 8b of the support rod 8 is formed to have a smaller diameter than the hole of the shaft member 11. The shaft member 11 is elastically supported, together with the pulley body 5, to the supporting part 8b through the rubber elastic body 10.

Figure 3:
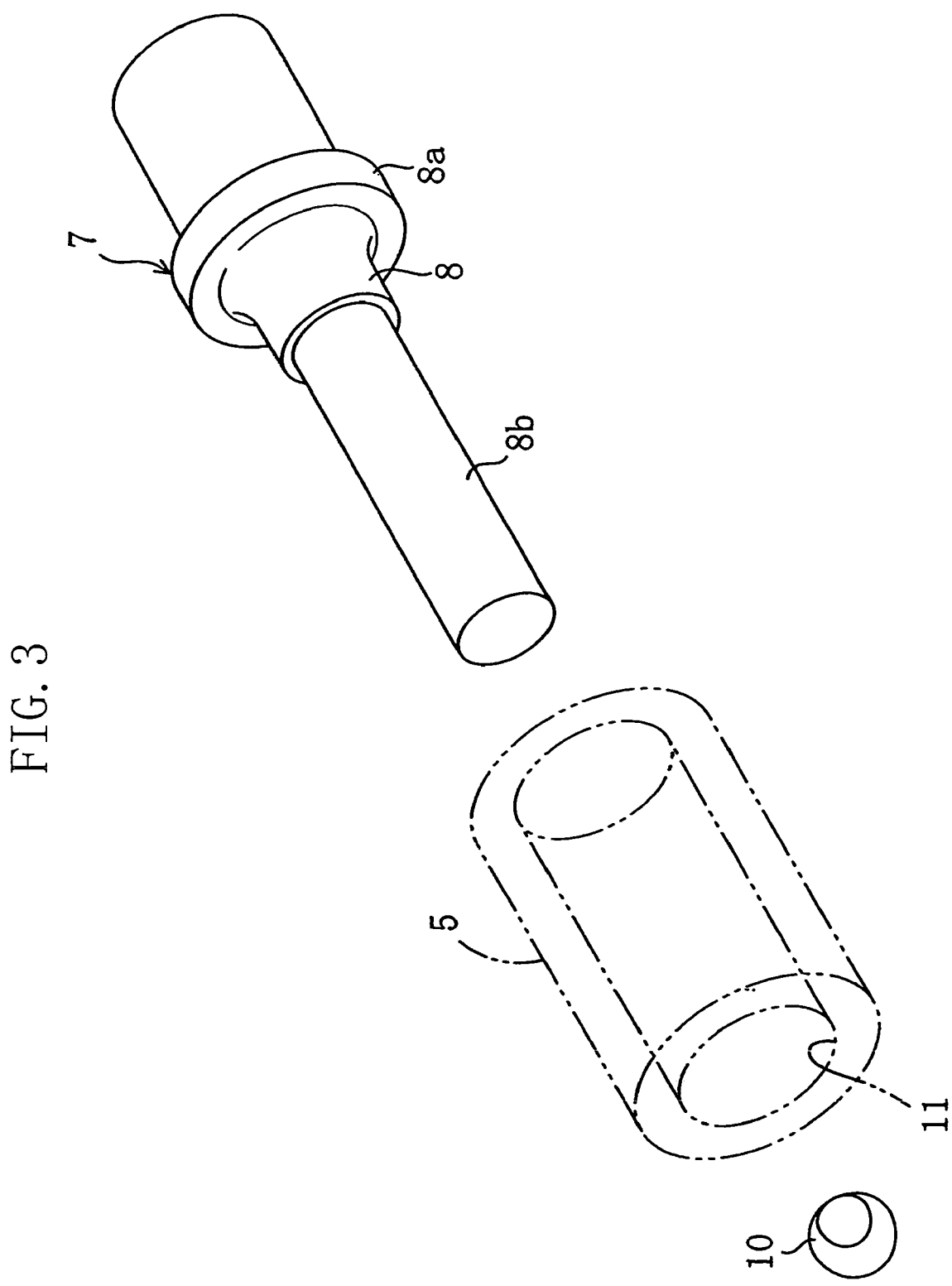
FIG. 3 is an exploded perspective view of the drive belt pulley.

The rubber elastic body 10 is formed into a solid, truncated cone as shown in FIG. 3, and disposed approximately in the middle of the width of the pulley body 5 as show in FIG. 2. The rubber elastic body 10 is adhered at its top surface to the periphery of the supporting part 8b of the support rod 8 and at its bottom surface to the inner surface of the shaft member 11. Therefore, a portion of the shaft member 11 located approximately in the middle of the width of the pulley body 5 is constrained, by the rubber elastic body 10, to the periphery of the supporting part 8b of the support rod 8. The other portions of the shaft member 11 are not constrained to the support rod 8. In other words, in the other portions of the shaft member 11 not provided with the rubber elastic body 10, a gap is left between the shaft member 11 and the supporting part periphery of the support rod 8.

Figure 4:
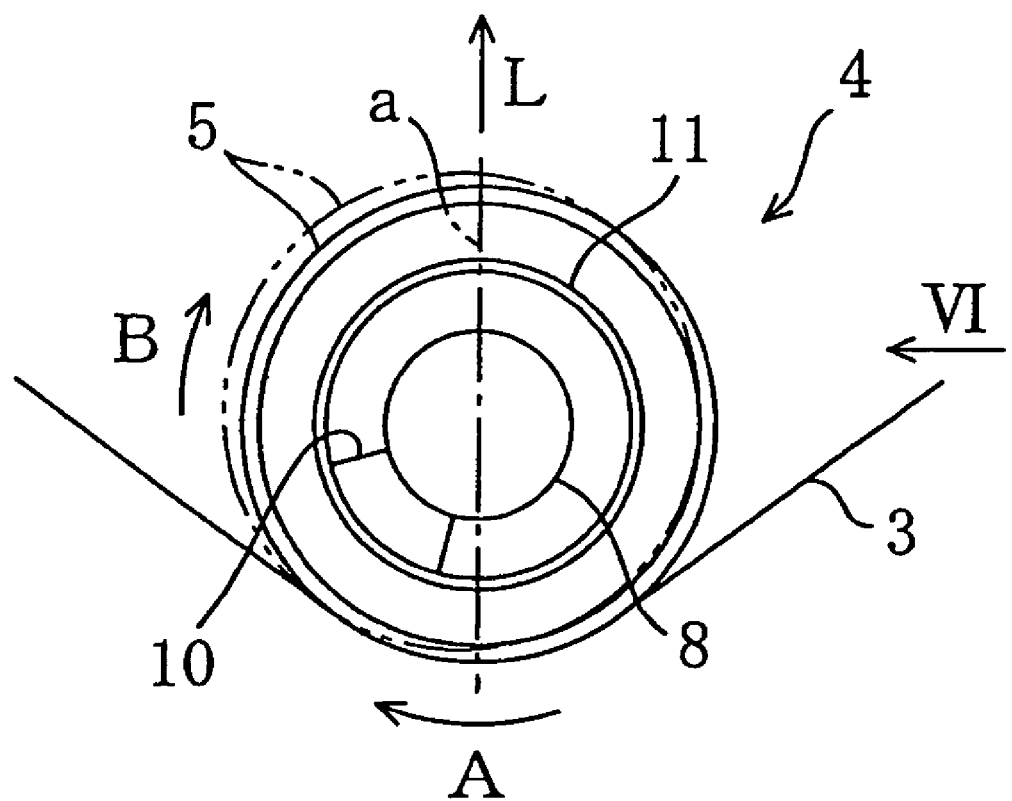
FIG. 4 is a front view showing a state of use of the drive belt pulley.
Figure 7:
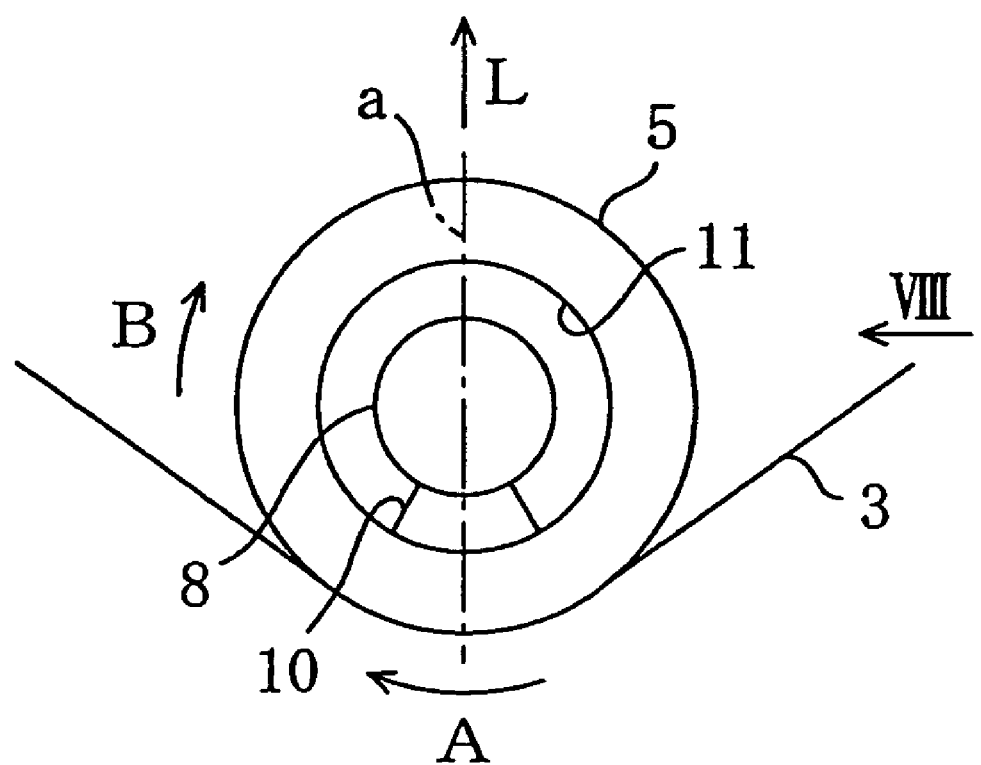
FIG. 7 is a front view showing another state of use of the pulley.

As shown in FIG. 4, the drive belt pulley 4 is used by placing the rubber elastic body 10 within a quarter (within the angular range from 0° to 90°) of the periphery of the supporting part 8b that is located, when viewed along the axis of the shaft member 11, to the side of the pulley body 5 around which the drive belt 3 is wrapped (the lower side thereof in FIG. 4) and forward of the line of action a of a radial shaft load L passing through the axis of the shaft member 11 with respect to the direction B of rotation of the pulley body 5. Alternatively, as shown in FIG. 7, the drive belt pulley 4 may be used by positioning the rubber elastic body 10 on the line of action a of the radial shaft load L. In the example of FIG. 4, the rubber elastic body 10 is placed in a position rotated 45 degrees forward of the line of action a with respect to the direction B of pulley rotation.

In the state of use shown in FIG. 4, the shaft member 11 is constrained to the above-described quarter of the supporting part periphery of the support rod 8 (a position thereof at an angle of 45° with respect to the line of action a) by the rubber elastic body 10. Therefore, when a radial shaft load L is applied to the shaft member 11, the shaft member 11 produces a moment with its constrained portion as a fulcrum to move angularly together with the pulley body 5 as shown in the dash double dot line in FIG. 4.

Figure 5:
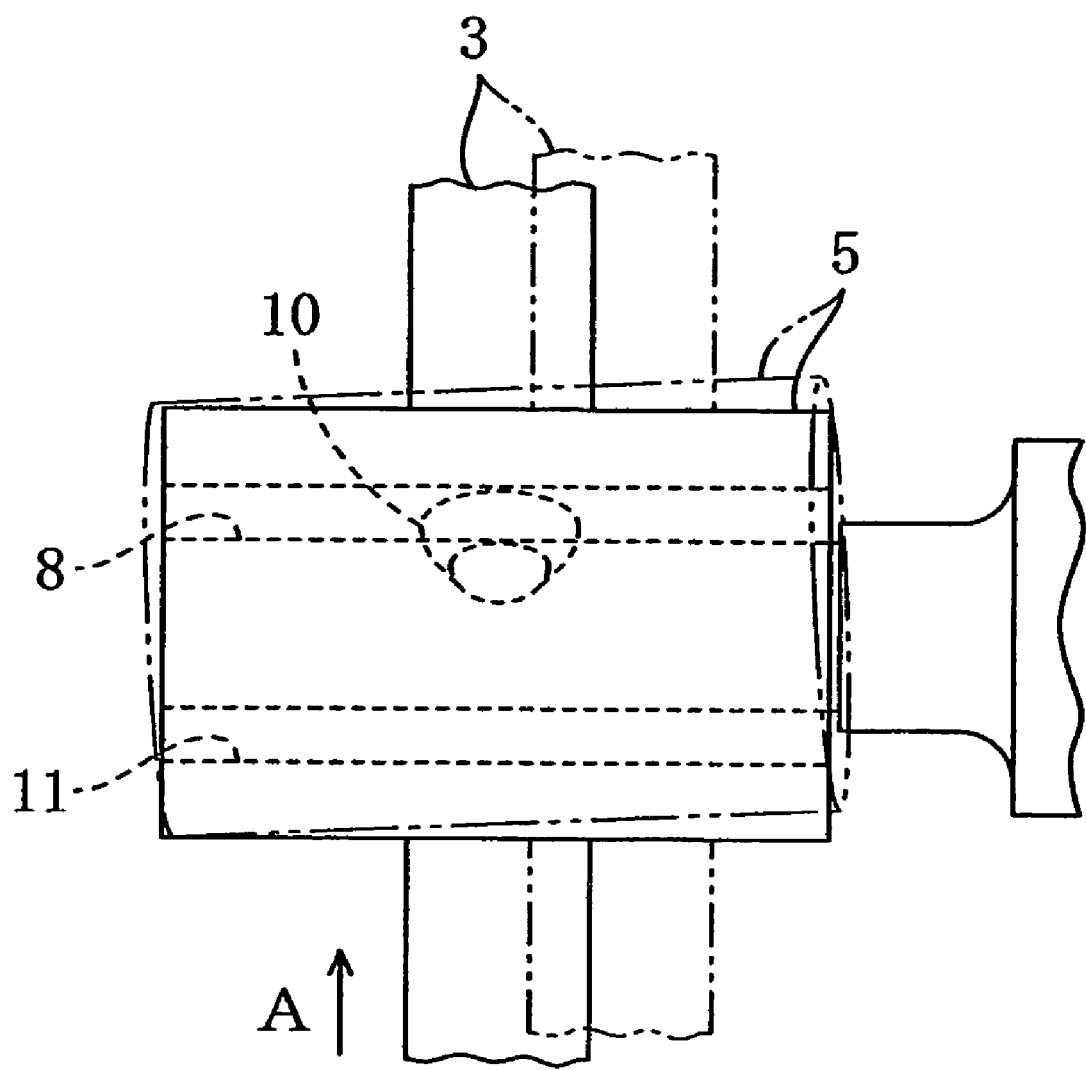
FIG. 5 is a plan view showing an angular movement of a pulley body when the drive belt has deviated to one side in the above state of use.
Figure 6:
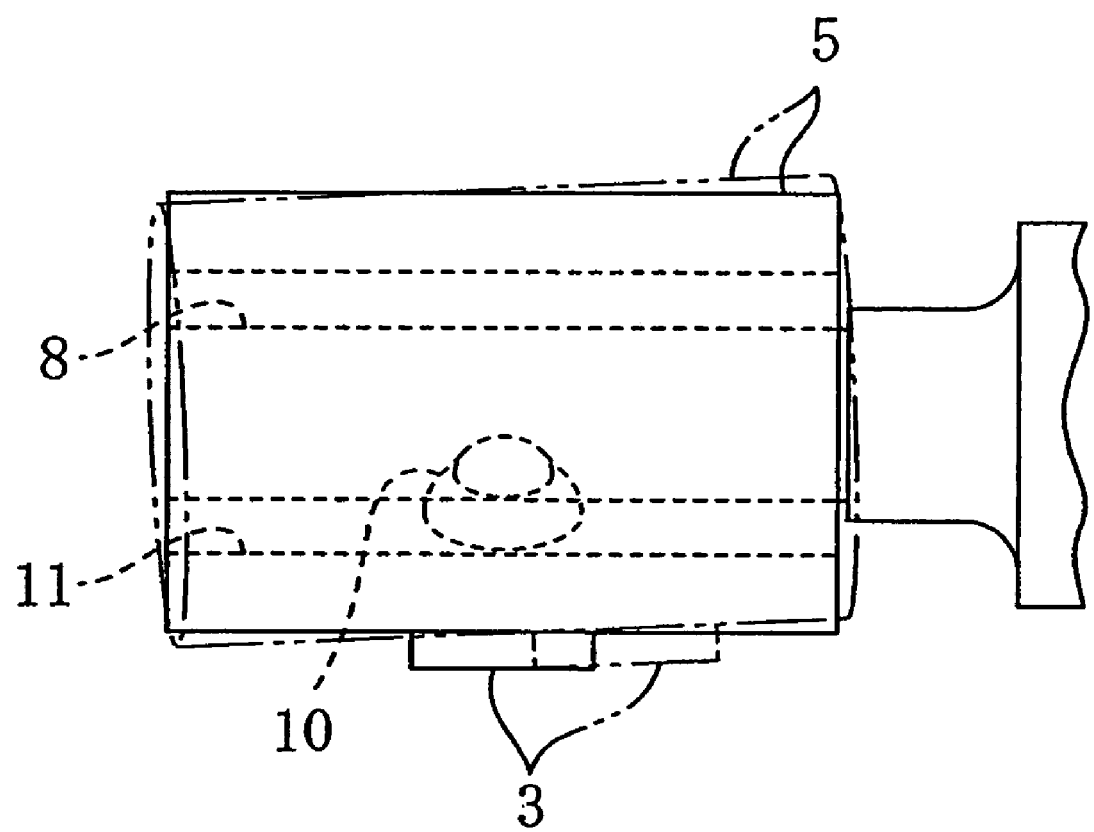
FIG. 6 is a side view taken in the direction of arrow VI of FIG. 4.

Then, when the drive belt 3 deviates from the vicinity of the center of the width of the pulley body 5 to one side as shown in the dash dot lines in FIG. 5 (plan view) and FIG. 6 (view taken in the direction of arrow VI of FIG. 4), the component of the radial shaft load on the one side of the pulley body 5 accordingly becomes larger than that on the other side. Therefore, the one side of the pulley body 5 moves toward the direction of the radial shaft load L and concurrently forward in the travel direction A of the drive belt 3 relative to the other side thereof.

To be more specific, since the side of the pulley body 5 toward which the drive belt 3 has deviated moves toward the direction of the radial shaft load L, the pulley body 5 is inclined so that when its working surface height is viewed with respect to the direction of the radial shaft load L, the side thereof toward which the drive belt 3 has deviated is lower and the opposite side is higher. The drive belt 3 thus receives a return force opposite to the direction of its deviation.

Furthermore, since the side of the pulley body 5 toward which the drive belt 3 has deviated moves forward in the travel direction A of the drive belt 3, the pulley body 5 assumes such an oblique position to the drive belt 3 that the side of the pulley body 5 toward which the drive belt 3 has deviated leans forward in the belt travel direction A. The pulley body 5 rotates in such an oblique position, whereby the drive belt 3 receives a return force of compensating for its deviation from the pulley body 5.

Therefore, the drive belt 3 runs at its position where equilibrium is established between the above-mentioned return force resulting from angular movement of the pulley body 5 and a deviation force acting on the drive belt 3 according to the characteristics of the belt drive system. Even if the drive belt 3 largely deviates to one side, the drive belt 3 will be returned to the position where equilibrium is established between the return force and the deviation force.

Figure 8:
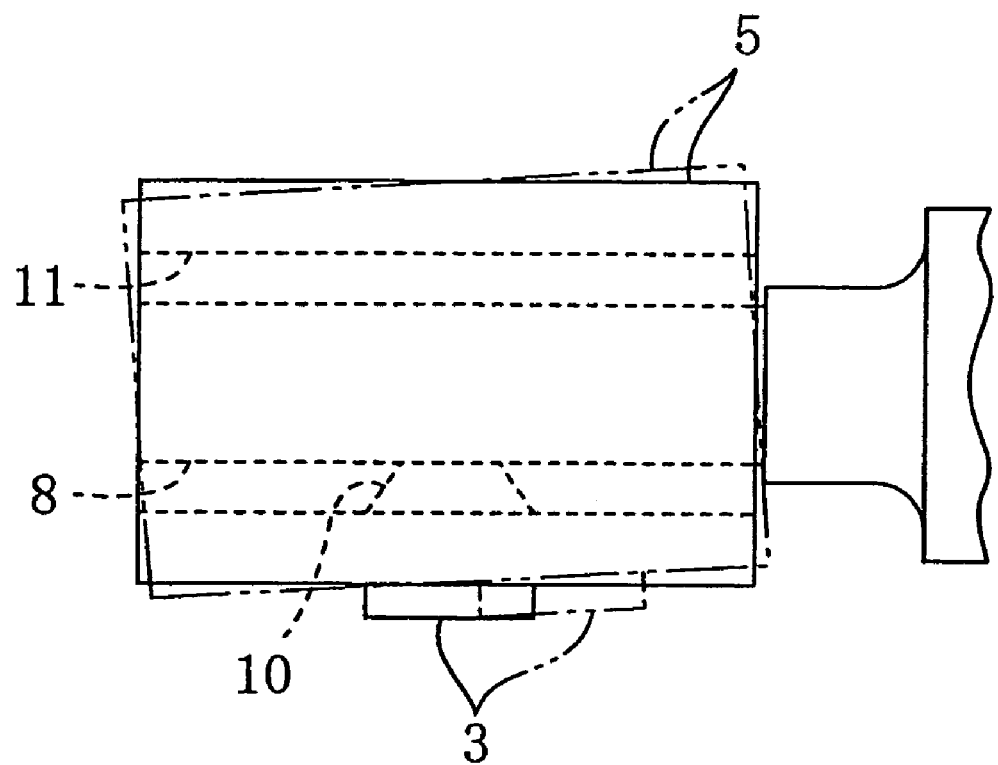
FIG. 8 is a side view taken in the direction of arrow VII of FIG. 7.

In the state of use shown in FIG. 7, when the drive belt 3 deviates to one side of the pulley body 5, the component of the radial shaft load L on the one side of the pulley body 5 becomes larger than that on the other side thereof as shown in FIG. 8 (view taken in the direction of arrow VIII of FIG. 7). Therefore, the pulley body 5 produces an angular movement in which the one side thereof moves in the direction of the radial shaft load L relative to the other side. The pulley body 5 is thus inclined so that when its working surface height is viewed with respect to the direction of the radial shaft load L, the one side thereof is lower and the other side is higher. As a result, the drive belt 3 receives a return force opposite to the direction of its deviation.

In this manner, the drive belt 3 runs at its position where equilibrium is established between the return force resulting from the pulley body 5 being inclined and a deviation force acting on the drive belt 3 according to the characteristics of the belt drive system. Even if the drive belt 3 largely deviates to one side, the drive belt 3 will be returned to the position where equilibrium is established between the return force and the deviation force.

Figure 9:
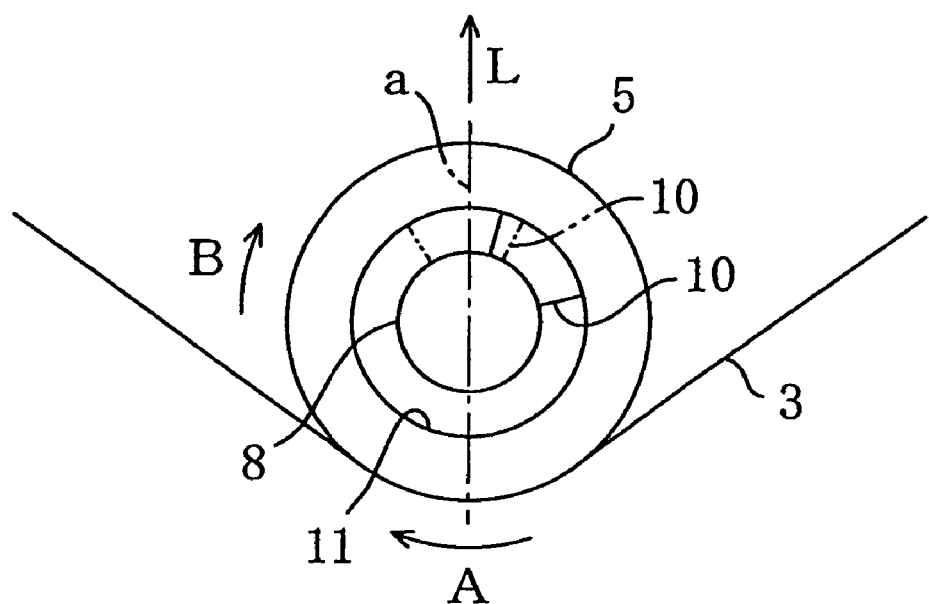
FIG. 9 is a front view showing still another state of use of the pulley.

In the above states of use, the rubber elastic body 10 of the pulley 4 is placed to the side of the pulley body 5 around which the drive belt 3 is wrapped. As an alternative, as shown in FIG. 9, the rubber elastic body 10 may be placed to the opposite side of the pulley body 5 and within a quarter of the periphery of the supporting part 8b that is located forward of the line of action a of the radial shaft load L passing through the axis of the shaft member 11 with respect to the direction B of rotation of the pulley body 5. As another alternative, as shown in the dash double dot lines in FIG. 9, the rubber elastic body 10 may be placed to the opposite side of the pulley body 5 and on the line of action a of the radial shaft load L. In these cases, though a tension load resulting from the radial shaft load is applied to the rubber elastic body 10, there can be obtained the same effects as in the state of use shown in FIG. 4 or in the state of use shown in FIG. 7.

When the pulley 4 is used as a tension pulley as described above, a stable tension can be applied to the drive belt 3, which is advantageous in bringing out a full power transmission performance of the drive belt 3.

Other Embodiments

Figure 10:
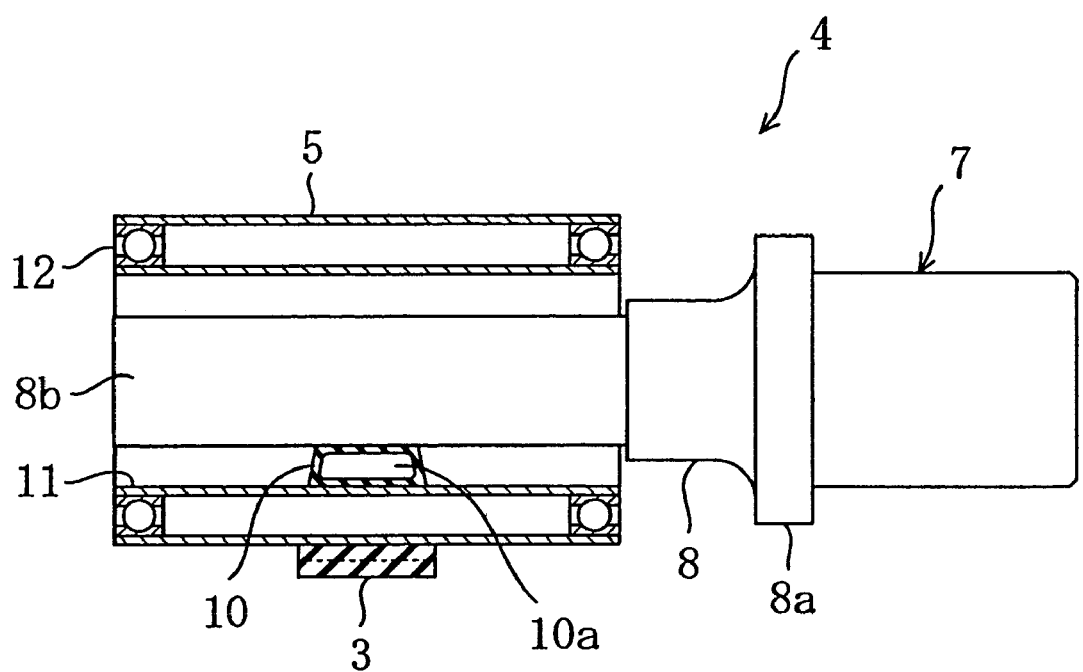
FIG. 10 is a diagram showing a pulley having an air cell provided in an elastic body, corresponding to FIG. 2.
Figure 11:
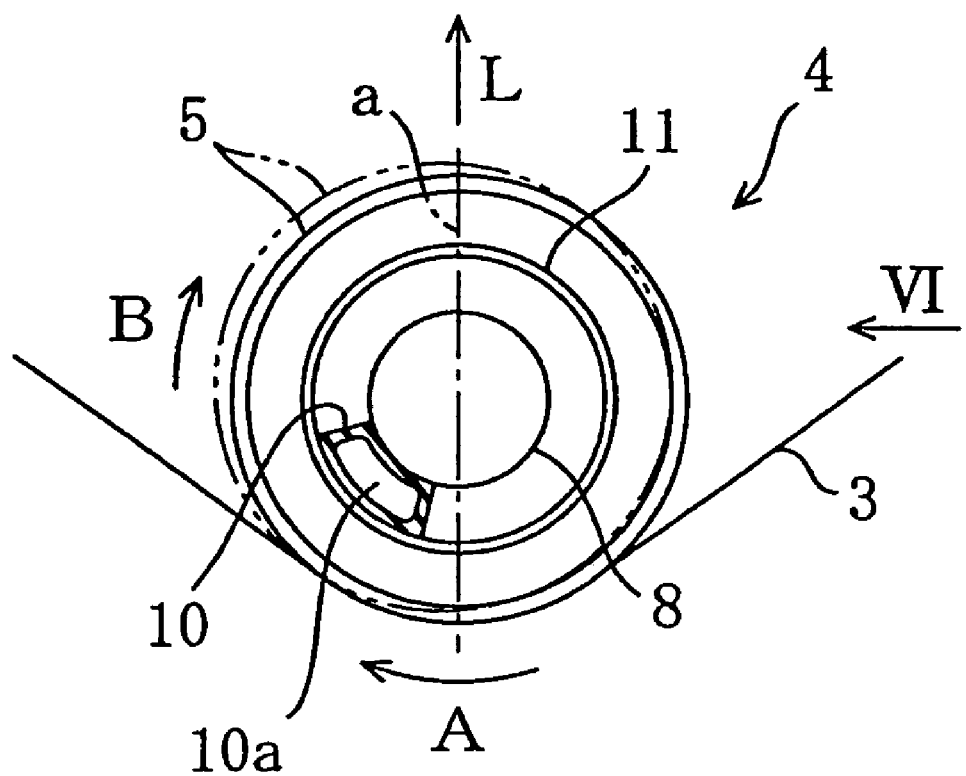
FIG. 11 is a diagram showing the pulley of FIG. 10, corresponding to FIG. 3.

The configurations of the drive belt pulley and the belt drive system using the same according to the present invention are not limited to those described above, but include various kinds of other configurations. For example, as shown in FIGS. 10 and 11, the rubber elastic body 10 may be provided internally with an air cell (gas cell) 10a filled with high-pressure air (or other gases such as nitrogen gas). In this case, the elastic modulus (elastic coefficient) of the rubber elastic body 10 can be changed by controlling the pressure in the air cell 10a. This enables the control of the amount of angular movement of the pulley body 5 and the shaft member 11 due to a radial shaft load thereon. Therefore, the drive belt pulley and the belt drive system using the same according to the present invention can easily be adjusted so that the proper equilibrium is established between the deviation force acting on the drive belt 3 in the above-described manner and the return force.

Figure 12:
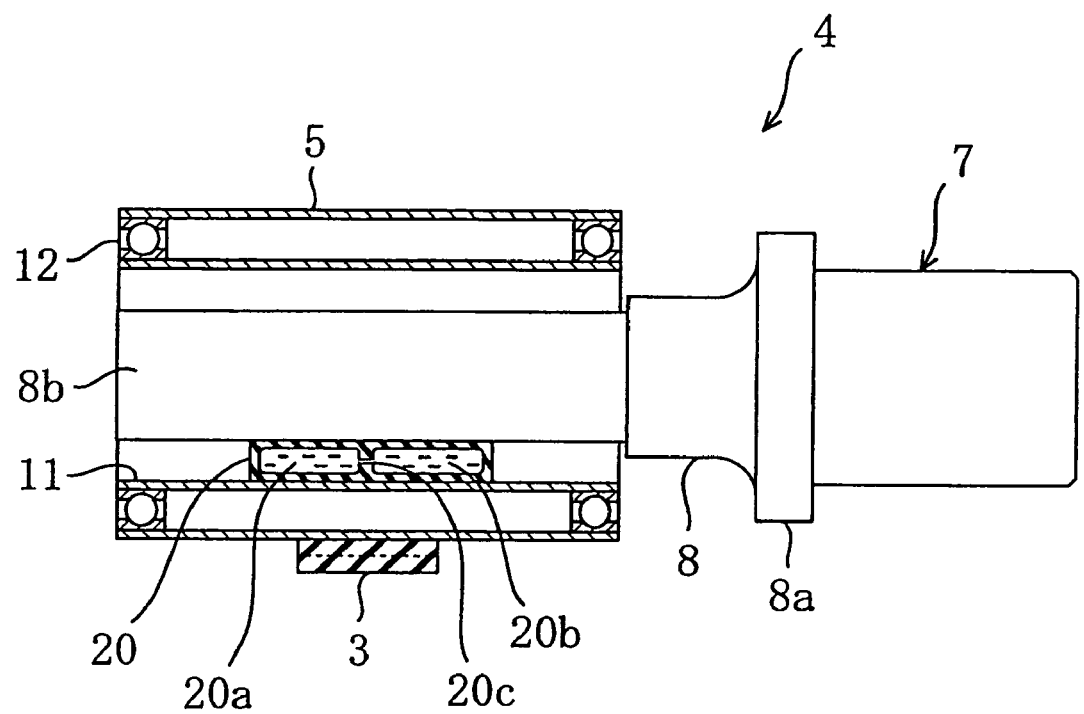
FIG. 12 is a diagram showing a pulley having liquid cells and an orifice path provided in an elastic body, corresponding to FIG. 2.
Figure 13:
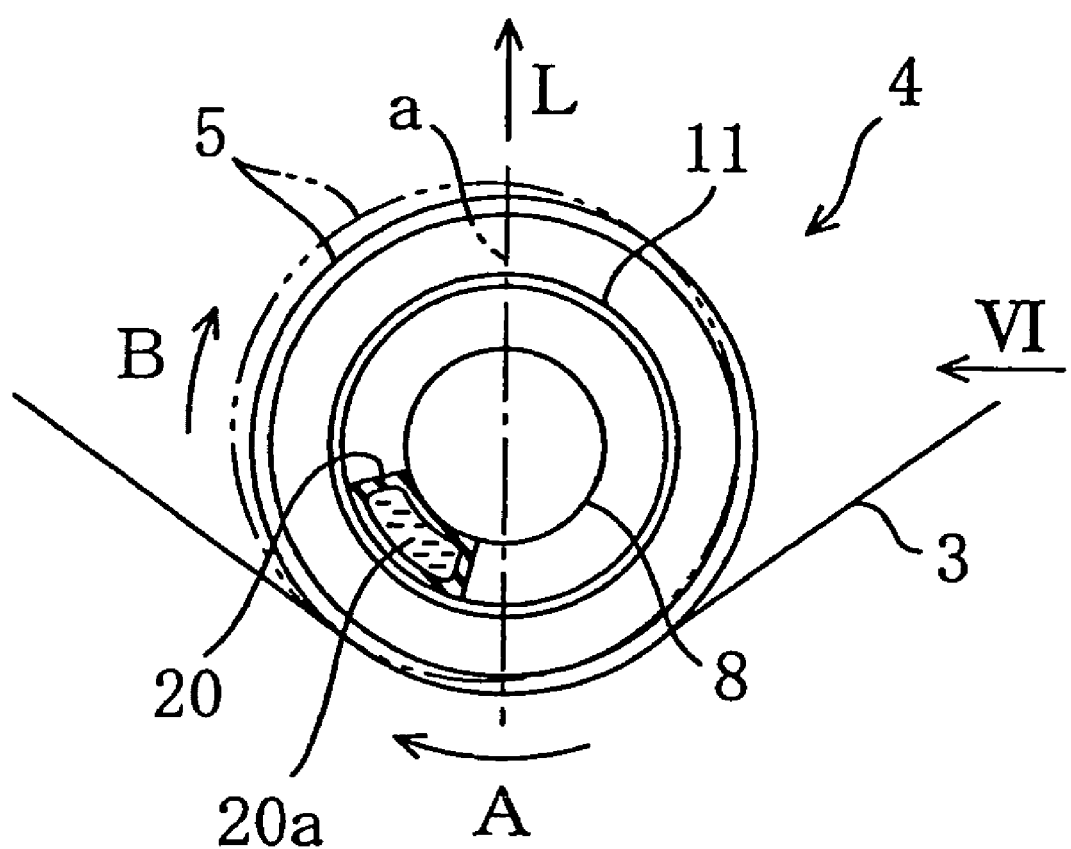
FIG. 13 is a diagram showing the pulley of FIG. 12, corresponding to FIG. 3.

Alternatively, as shown in FIGS. 12 and 13, a rubber elastic body 20, which elastically supports the pulley body 5 and the shaft member 11 to the support rod 8, may be provided internally with two liquid cells 20a and 20b each filled with damping liquid; and an orifice path 20c connecting both the liquid cells 20a and 20b. In this case, when the pulley body 5 and the shaft member 11 have slightly angularly deviated from their normal position with respect to the support rod 8 because of vibration of the running drive belt 3, the rubber elastic body 20 slightly deforms so that the damping liquid flows through the orifice path 20c from one liquid cell to the other. The flow resistance occurring at this time also attenuates the vibration from the running drive belt 3. Therefore, the capability of absorbing vibration from a running belt can be improved.

In addition, if the length and sectional area of the orifice path 20c is set suitably, the capability of attenuating vibrations over a specific frequency range can be improved. Furthermore, if magnetic fluid or magnetorheological fluid is used as the damping liquid, the flow resistance can be changed by applying a magnetic force to the damping liquid, which makes it possible to variably control the vibration attenuation capability.

In the above embodiments, the outer periphery of the pulley body 5 may be crowned gently. If the crown on the pulley body 5 is gentle, the drive belt 3 can avoid application of a large load thereon.

The pulley body 5 may be provided at both side edges with flanges to prevent the drive belt 3 from dropping out of the pulley body 5 when an abnormal external force is applied to the drive belt 3. Since, as described above, sidetracking and wobbling of the drive belt 3 can be prevented by angular movement of the pulley body, the drive pulley hardly contacts with the flanges. Therefore, there occurs neither fuzzing of the side face of the drive belt 3 nor fraying of the cord.

In the present embodiment, the pulley 4 is used as a tension pulley. The pulley of the present invention, however, can be used for other purposes of a drive system, such as adjustment of the length or contact angle of a drive belt, or change of the direction of belt travel.

INDUSTRIAL APPLICABILITY

Since, as described so far, the drive belt pulley and the belt drive system using the same both according to the present invention can certainly prevent wobbling and sidetracking of the belt, the belt drive system can be effectively used as a flat-belt drive system with very high power transmission efficiency for various kinds of industrial machines and other equipment, and therefore has industrial applicability.

What is claimed is:

1. A drive belt pulley comprising:
a hollow cylindrical pulley body around which a drive belt is to be wrapped;
a hollow cylindrical shaft member that rotatably carries the pulley body;
a support rod that is inserted in the shaft member and has a smaller diameter than the hole of the shaft member; and
an elastic body that elastically supports the shaft member, together with the pulley body, to the periphery of the support rod,
wherein the elastic body is provided to constrain the shaft member to the support rod with a higher degree within a quarter of the periphery of the support rod that is located, when viewed along the axis of the shaft member, forward of the line of action of a radial shaft load on the shaft member with respect to the direction of rotation of the pulley body than within the rest of the periphery of the support rod, and
when the drive belt deviates to one side of the pulley body, the one side of the pulley body moves toward the direction of the radial shaft load and concurrently moves forward in the travel direction of the drive belt relative to the other side with a portion of the shaft member, acting as a fulcrum, relatively strongly constrained to the support rod and the pullet body is positioned obliquely relative to the drive belt.

2. The drive belt pulley of claim 1, wherein the elastic body is made of rubber and placed on the periphery of the support rod to the side of the pulley body around which the drive belt is wrapped.

3. The drive belt pulley of claim 1, wherein the elastic body is placed at a single location on the periphery of the support rod and approximately in the middle of the width of the pulley body.

4. A belt drive system in which the drive belt pulley of claim 3 is pushed against the drive belt to apply tension to the drive belt.

5. The drive belt pulley of claim 1, wherein the elastic body is provided internally with a gas cell filled with compressed gas of a predetermined pressure.

6. The drive belt pulley of claim 1, wherein the elastic body is provided internally with a plurality of liquid cells each filled with damping liquid and one or more orifice paths connecting at least two of the liquid cells.

7. A belt drive system in which the drive belt pulley of claim 1 is pushed against the drive belt to apply tension to the drive belt.

* * * * *